Nov 1, 1949.  S. A. MALTHANER  2,486,569
WHEEL
Filed Oct. 22, 1945  2 Sheets-Sheet 1

INVENTOR.
Sylvester A. Malthaner
BY Walter E. Schirmer
Atty.

Patented Nov. 1, 1949

2,486,569

UNITED STATES PATENT OFFICE 2,486,569

WHEEL

Sylvester A. Malthaner, Niles, Mich., assignor to Clark Equipment Company, Buchanan, Mich., a corporation of Michigan Application October 22, 1945, Serial No. 623,686

6 Claims. (Cl. 301—13)

This invention relates to wheels, and more particularly is directed to wheels of the hollow spoke type adapted for receiving a pair of demountable tire rims to provide a dual wheel assembly for use on trucks, buses and similar types of vehicles.

There have been numerous attempts to develop a dual wheel of the hollow spoke type which would have simplicity of design, would provide for proper lateral spacing of the two rims, retaining such rims in positive alinement in planes at right angles to the axis of rotation of the wheel, and which also would accommodate rims which might be either on the high or low side of tolerance limitations without producing too much unbalance in the wheel construction.

One such type of design consisted of a spoke end construction utilizing a central radial abutment with individual spacing rings adapted to seat on axial shoulders on opposite sides of the abutment and up against the abutment to provide the lateral spacing desired, with the rims being drawn into tight engagement with the spacing bands by means of wheel lugs engaging the bevel surface of the rims. This construction requires considerable machining and very accurate design of the lugs and spacer bands to prevent unbalanced conditions in the wheel.

Still another type of design contemplated was the formation of a fixed tapered shoulder on the inboard side of the wheel against which the inboard rim was wedged. An axially movable spacer band was then interposed against the inboard rim and the outboard rim assembled in position, the entire assembly being then wedged over against the inboard shoulder or rim seat by a lug on the outboard side of the wheel engaging the outboard rim. This construction was subject to criticism due to the fact that it did not maintain true positive alinement of the rims in planes at right angles to the axis of the wheel body, consequently causing wobble of the rims and appreciable tire wear.

The present invention contemplates a departure from both of these established types of design, and broadly is directed to a dual wheel assembly in which there is a minimum machining required, in which the advantage of a positive location of the spacing band is provided, and in which possible eccentricities and high and low limits of rim design can be accommodated without introducing unbalance into the wheel structure.

One of the primary objects of the present invention is to provide a construction in which the spoke end can be readily machined to provide axial seating shoulders, with no interruptions, these shoulders forming supports upon which rim-engaging lugs can ride. In this connection, the invention contemplates the assembly of the inboard rim over the spoke ends and the subsequent anchoring of a spacer band intermediate the inboard and outboard rims whereby, upon tightening of the lugs, the two rims are drawn in opposite directions up against the anchored spacer band to provide the positive lateral alinement desired without the introduction of independent spacing bands and the consequent disadvantages inherent therein.

Still another object of the present invention is to provide means whereby the wheel spider can be machined by broaching across the spoke ends to provide axial surfaces thereon with no necessity of machining either rim seats on the spoke end or center abutments. This simplifies the wheel spider design considerably, and also decreases the cost thereof.

Another advantage of the present invention is the provision of means whereby the spacer band between the two rims can be inserted in position over the spoke ends of the wheel spider after the inner rim has been placed in position, and can then be anchored in a stationary position relative to the wheel spider prior to drawing the rims into fixed position against opposite edges of the spacer band.

Other objects and advantages of the present invention will appear more fully from the following detailed description which, taken in conjunction with the accompanying drawings, will disclose to those skilled in the art the particular construction and operation of a preferred form of the present invention.

Figure 1:
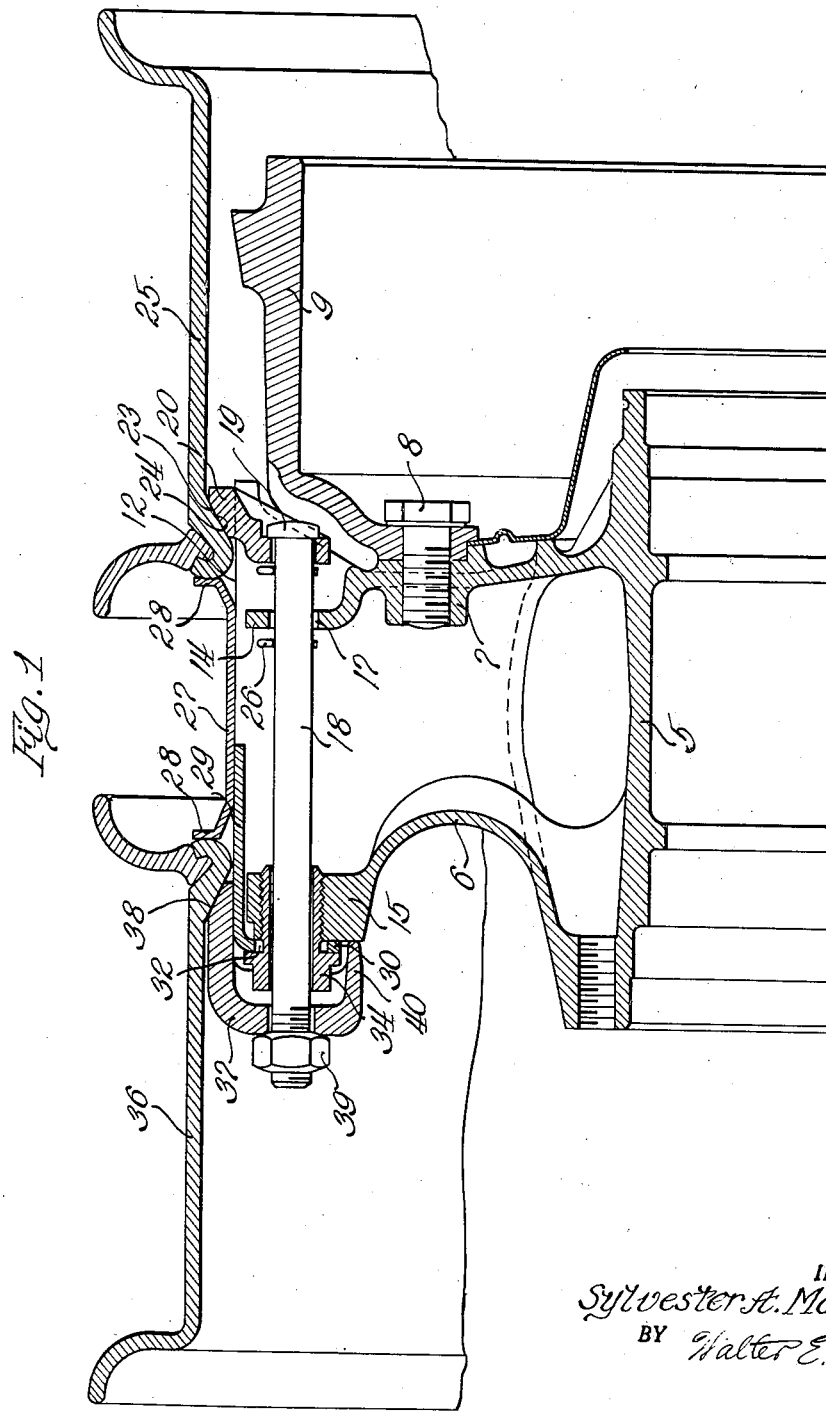
Figure 1 is a sectional view through a wheel spider showing the details of the present invention.

Referring now in detail to the drawings, in Figure 1 there is provided a wheel spider 5 having the radially extending hollow spokes 6, the rear sides or inboard sides of these spokes being provided with bosses 7 adapted to receive studs 8 for securing a brake drum 9 thereto.

Figure 3:
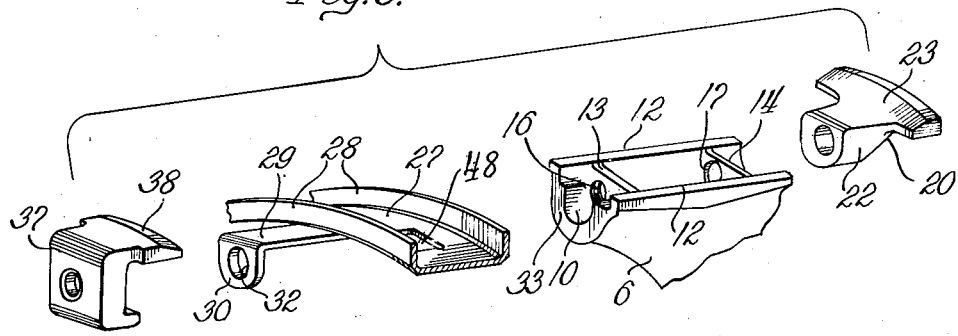
Figure 3 is an exploded view of the spoke end lugs and spacer band as incorporated in the present invention.

The spider 5 is provided with a plurality of spokes, such as the spokes 6, each of which is enlarged at its upper end to provide a spoke end substantially as shown in Figure 3. This spoke end comprises a U-shaped socket portion 10 at the outboard side of the spoke defined by axially extending seats 12 which are spaced apart by transverse web portions 13 and 14. The transverse web portion 13 is of increased thickness adjacent the lower portion thereof, as shown in section at 15 in Figure 1, for a purpose to be described hereinafter. Also, this web portion is provided with internal threads in the aperture 16 whereas the web 14 is merely provided with an aperture 17. Extending through the apertures 16 and 17 is a through bolt or stud 18, which is provided with a headed end 19 at the inboard side of the spoke end receiving the rim lug 20. The rim lug 20 is provided with the depending boss portion 22 and with a laterally spread arcuate portion 23 having a beveled surface adapted to engage the beveled surface 24 of the inboard rim 25. In the assembly of the dual wheel, the stud 18 is first placed in position in the spoke end with the lug 20 attached thereto and seated on the inboard ends of the surfaces 12. The stud is locked in position against removal by means of the cotter pin 26, and projects outwardly through aperture 16, this aperture being appreciably larger than the diameter of the stud.

The inboard rim is then passed over the axial surfaces 12 until it engages the inboard lug 20, after which a spacing band 27 having radially flanged peripheral edges 28 is moved into position over the spoke ends. The spacing band 27 closely embraces the spoke ends and rests upon the surfaces 12 intermediate the two rims. At circumferentially spaced points corresponding to the spacing of the spokes, the spacing band 27 is provided with arm portions 29 which lie in the recess between the surfaces 12 at each spoke end, and are secured to the inner surface of the band 27 as by welding, riveting, or the like. These arm portions 29 at their outer ends terminate in radially inturned end portions 30 which are apertured as at 32 to fit about the stud 18, and to bear against the radial face 33 at the outboard end face of the spoke. A suitable lock nut 34 is passed over the projecting portion of the stud, and is threaded into the threads of the aperture 16 of the transverse web 13 to clamp the down turned flange portion 30 of the arms 29 against the surface 33. The nuts 34 for this purpose are provided with radially extended flange portions to provide an adequate bearing surface against the radially inturned flange portions 30 to thereby lock the flange 30 firmly against the radial surface 33 of the spoke end.

In this manner, the spacing band 27, through its connection by means of the arm 29, is positively located in position relative to the spoke end so that it substantially bisects the radial center plane of the wheel spider intermediate the bearing surfaces by which the spider is mounted for rotation. With the band 27 thus firmly locked in position, it is apparent that the equivalent of a fixed central radial abutment is provided. The outboard rim 36 is then moved into position against the outboard radial flange 27 of the spacer band, the rim being supported upon the outboard terminal ends of the axial radial surfaces 12. An outer clamping lug 37 is then moved into position, this lug having the beveled surface 38 engaging the corresponding beveled surface on the outboard rim 36. The nut 39 is then threaded over the outer end of the stud 18 and, upon tightening, draws the lugs 37 and 20 toward each other, thereby moving the rims 25 and 36 up against the radial flanges 28 of the spacing band for wedging these rims in locked position upon the wheel spider. It will be noted that the lug 37 is provided with the heel portion 40 which bears against the radial surfaces 33 radially inwardly of the flange 30 and nut 34. This prevents the lug 37 from being tipped during the tightening action, and insures positive tightening of the two rims in fixed position and in parallel planes at right angles to the axis of rotation of the wheel.

It should also be noted that the nut 34 is of the same size as the nut 39 so that the same wrench may be used for tightening both of these nuts, it being understood that a deep throated socket wrench may be provided for this purpose.

It is thus believed apparent that with this construction a minimum of machining upon the spoke end is required since the only two surfaces which have to be machined are the axial surfaces 12 defining the spoke end and the radial outboard surface 33. A broaching operation is normally sufficient for the surfaces 12, and the surfaces 33 can be readily milled in any desired manner.

Figure 2:
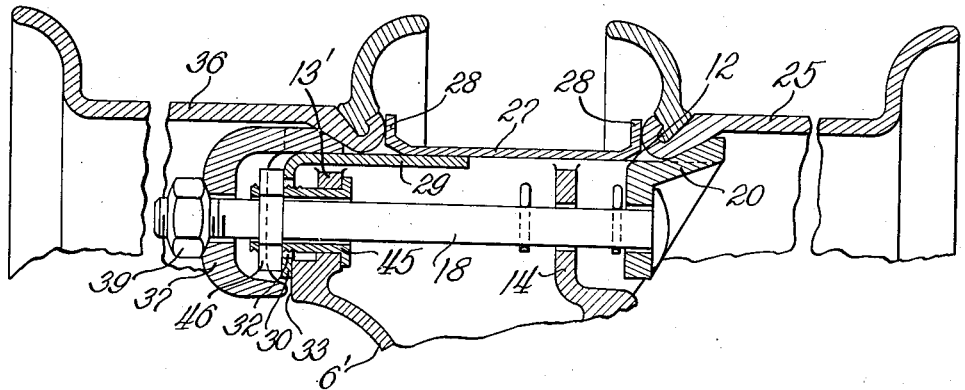
Figure 2 is a corresponding sectional view through a modified form of construction.

In the form of the invention shown in Figure 2, substantially the same type of construction is provided except for the details of the method of clamping the spacer band in position against axial movement relative to the spoke end. Similar reference numerals are used for corresponding parts in the two forms of the invention. The spoke end 6' in Figure 2 is provided with the transverse web 14 supporting the inner end of the stud 18, which stud carries the inboard lug 20 at its inner end upon the surfaces 12 of the spoke end. The spacer band 27 may be of the same type as described in connection with Figure 1, having the radial flange portion 28 and the arm 29 secured thereto at circumferentially spaced intervals and having the radial inturned flange 30. However, in this form of the invention, the outboard surface 33 of the spoke end which is machined to receive the flange 30 has the transverse web portion 13' offset inwardly slightly, and apertured inwardly sufficiently to receive the threaded bushing 45. This bushing is inserted into the aperture 13' from the inboard side thereof, and projects outwardly encircling the stud 18 and through the aperture 32 in the flange 30. A suitable nut 46 is threaded over the projecting end of the bushing or sleeve 45 to clamp the flange 30 tightly against the radial surface 33 for locating the spacing band 27 in fixed position. When this has been accomplished after the inboard rim has been assembled into position, the outboard rim 36 is moved into position and the lug 37 seated on the surfaces 12 to clamp the outboard rim against the outboard rim 28 of the spacer band in the manner described in connection with Figure 1.

It will be noted that the spacer band, as shown in Figure 3, is provided with apertures 48 in the web portion thereof. These apertures are for the purpose of allowing mud and snow to pass therethrough between the two tires, and also to provide for suitable ventilation between the two rims, and also to provide for air flow from the brake drum 9 through the space between the spokes and radially outwardly between the two rims 25 and 36.

It is therefore believed apparent that I have provided a novel type of dual wheel construction utilizing a demountable spacer band which can be fixed in position relative to the spider after the inboard rim is assembled into position, and which will be positively located to provide for positive lateral alinement of the two rims. Furthermore, this is accomplished without the necessity of providing a fixed seat at the inboard side of the spoke end.

It is also apparent that with this construction, a variation in the width of the spacer band will provide for the desired variation in the spacing between the two rims, thereby accommodating the same wheel spider to various spacings of rims thereon within a relatively wide range.

I do not intend to be limited to the exact details herein shown and described, but only insofar as defined by the scope and spirit of the appended claims.

I claim:

1. In a dual wheel assembly, a wheel spider having radially extending spokes, axially extending seating surfaces at each spoke end, an inboard rim-receiving lug on said surfaces, a rim having a bevelled edge seated on said lug, a spacer band encircling said spoke ends and having anchoring means comprising arms extending axially from said band and having inturned flange ends, locating surfaces on said wheel spider, clamp means carried by said spider for securing said flange ends on said locating surfaces, an outboard rim, an outboard rim-receiving lug on said seating surfaces engaging said outboard rim, and through bolt means interconnecting said lugs for firmly drawing said rims up against opposite edges of said band.

2. In combination, a wheel spider having radially extending spokes terminating in parallel circumferentially spaced axially extending seating surfaces, a transverse web disposed between said surfaces radially inwardly thereof, a spacer band movable axially over said spoke ends, means on said band engaging said web, and means for clamping said band means to said web.

3. The combination of claim 2 wherein said band means comprises laterally extending arms disposed between said seating surfaces at each spoke end and having radially inturned ends engaging said webs.

4. The combination of claim 2 further characterized by the provision of a pair of bevel edge type tire rims disposed on opposite sides of said bands, rim lugs slidable axially on said surfaces and engaging the bevel edges of said rims, and bolt means for drawing said lugs toward each other to clamp said rims against opposite sides of said band.

5. In combination, a dual wheel spider having radially extending spokes terminating in spoke ends having axially extending seating surfaces, transverse webs in said spoke ends, a spacer band slidable axially over said spoke ends and including arm means extending laterally from said band between said surfaces, and means for locking the arm means to said webs to anchor said band against axial movement on said spider.

6. In a dual wheel assembly, a wheel spider having axially extending seating surfaces at the spoke ends thereof, rim lugs axially slidable on said surfaces, tire rims having bevel edges engaged by said lugs, a spacer band intermediate said rims axially slidable over said spoke ends, means for anchoring said band in predetermined fixed position on said spider, means for drawing said lugs toward each other to clamp said rims firmly against opposite sides of said band, said anchoring means and said lug drawing means each including nut members operable by a common wrench.

SYLVESTER A. MALTHANER.

REFERENCES CITED

The following references are of record in the file of this patent:

UNITED STATES PATENTS

| Number | Name | Date |
|---|---|---|
| 1,827,792 | Keller | Oct. 20, 1931 |
| 1,838,050 | Brunner | Dec. 22, 1931 |
| 1,901,629 | Burger | Mar. 14, 1933 |
| 1,927,579 | Walther | Sept. 19, 1933 |
| 2,048,150 | Walther | July 21, 1936 |

FOREIGN PATENTS

| Number | Country | Date |
|---|---|---|
| 327,131 | Italy | Aug. 4, 1935 |